J. W. FRAZIER & F. E. HANSEN.
HOSE CONNECTION.
APPLICATION FILED DEC. 13, 1915.
1,207,392.
Patented Dec. 5, 1916.
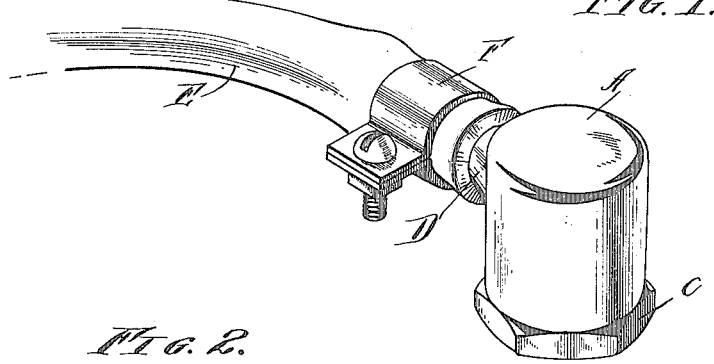
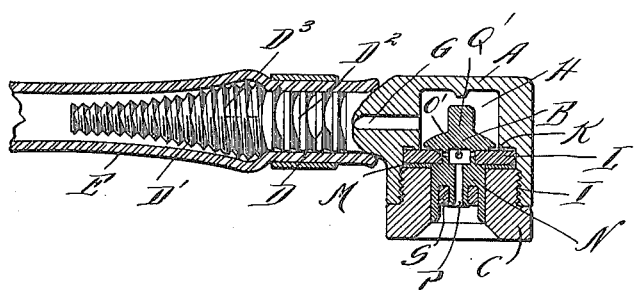
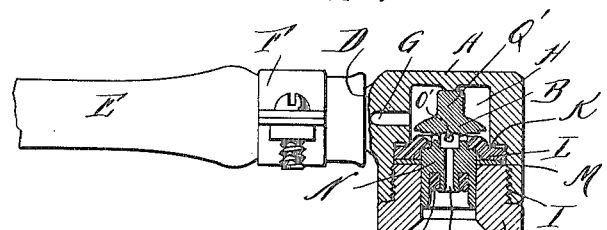
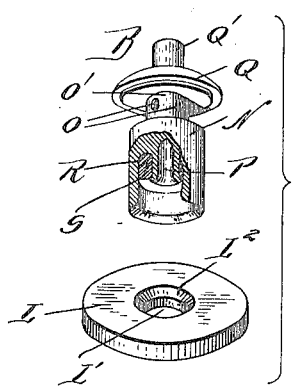
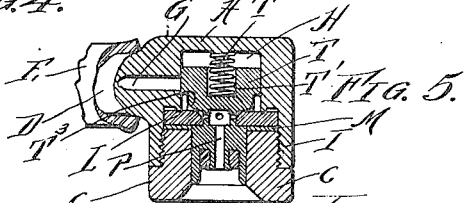

UNITED STATES PATENT OFFICE.

JAMES W. FRAZIER AND FRED E. HANSEN, OF CLEVELAND, OHIO.

HOSE CONNECTION.

1,207,392.  Specification of Letters Patent.  Patented Dec. 5, 1916.

Application filed December 13, 1915. Serial No. 66,415.

*To all whom it may concern:*

Be it known that we, (1) JAMES W. FRAZIER and (2) FRED E. HANSEN, citizens of the United States, residing at Cleveland, in the county of Cuyahoga and State of Ohio, have invented a certain new and useful Improvement in Hose Connection, of which the following is a full, clear, and exact description, reference being had to the accompanying drawings.

This invention is a novel construction of hose connection employed for inflating tires.

One object is to provide an exceedingly simple and at the same time highly efficient form of device by means of which the connection between the air supply hose and tire valve can be quickly and easily effected by the mere insertion of the tire valve nipple and pressure thereon sufficient to open the valve of the hose connection, this contact and pressure also providing a perfectly tight joint between the valve and tire nipple, thereby preventing any escape of air at that point.

Another object of the invention is to provide a valve of such construction that when not in use the air pressure within the hose connection will serve to maintain the valve securely seated and prevent the escape of air.

A still further object is to provide a device in which the valve can be easily unseated when the connection for inflation is made.

A still further object is to provide a novel construction of casing stem whereby said casing can be firmly united to the air supply hose.

With these and certain other objects which will appear as the description of the device proceeds, the invention consists in the novel features of construction and combination hereinafter fully described and pointed out in the claims.

In the drawing forming a part of this specification, Figure 1 is a perspective view of a hose connection constructed in accordance with our invention; Fig. 2 is a vertical sectional view of the same, the casing stem being shown in elevation; Fig. 3 is a vertical sectional view showing the valve opened; Fig. 4 is a detail view illustrating the various parts of the valve; and Fig. 5 is a sectional view showing a slight modification.

In constructing a device in accordance with our invention we employ a casing A preferably cylindrical in shape, a valve B arranged therein, and a nut C for holding the valve in place, the end of the nut being made hexagonal as usual. The casing is provided with a stem D for connecting the device to the air supply hose E, and in practice we prefer to make the extreme end of the stem tapered and threaded as shown at D', of uniform thickness as shown at $D^2$ with a shoulder or enlargement $D^3$ at the juncture of the uniform and tapered portion, the tapered threaded end facilitating the entry of the stem into the hose, and by the employment of a clip F between the shoulder and casing, a secure connection is obtained.

The stem D has an air passage G through which the air passes into the chambered portion H of the casing, the opposite end of the casing being slightly enlarged and threaded as shown at I in order to receive the threaded nut C. The interior annular shoulder formed by enlarging the lower portion of the casing is preferably grooved or beveled in order to provide an annular valve seat K against which a rubber disk or valve L is adapted to be clamped by the nut C as shown, a metallic ring M being preferably interposed between the rubber disk and nut, although such metallic ring is not a necessity.

The rubber disk or valve L is arranged upon a metallic stem N preferably round or cylindrical in form and reduced at O, said reduced portion having air inlet openings O', produced therein which communicate with the air passage P arranged centrally of the stem, said air inlet opening and passage providing the means for conveying the air under pressure to the tire when the valve is opened as hereinafter explained. Above the air inlet openings O', the stem is provided with a cap-like portion Q which terminates in a central upwardly projecting pin or finger Q. The rubber disk or valve L fits snugly upon the reduced portion of the stem between the stem proper and the cap, the central opening L' being properly sized to embrace the reduced portion, and the upper inner edges are preferably beveled as shown at $L^2$ in order that the air inlet openings O' may be exposed when the stem is forced inwardly by contacting with the tire stem, this inward movement of the stem serving to stretch or enlarge the central opening of the rubber disk or valve sufficiently to expose the openings and permit the passage of air from the chamber H through the passage P of the stem to the tire valve. The lower end of the valve stem M is preferably formed with an annular chamber R in which is seated the elastic ring S against which the end of the tire valve nipple presses or contacts and prevents the escape of air at this point.

In assembling the parts of the device the valve constituting the stem, a disk is inserted in the casing so that the rubber disk contacts with the valve seat K, and the nut C is then screwed into place, either with or without the interposition of the metallic ring M and when not in use the parts assume the position shown in Fig. 2, the pressure of air in the hose acting upon the cap portion of the valve and compressing the rubber sufficiently to combine the same against the air inlet openings and prevent the escape of air.

When it is desired to inflate a tire, the nipple of the tire valve is inserted in the chambered end of the valve stem M, the end of the tire nipple contacting with the elastic cushion or ring S within said chambered portion of the stem, making a tight contacting joint at this point and at the same time pushing the valve stem upwardly until the pin or finger Q' engages a boss in the top of the chambered portion of the casing. The rubber disk of valve L being secured between the valve seat and nut is held at its outer edge while the inner portion thereof is carried upwardly by the stem, said movement tending to open or enlarge the beveled central opening and thereby open or uncover the air inlet openings O' through which the air immediately passes to the passage P and through this passage into the tire valve. It will thus be seen that to make an operative connection, it is only necessary to insert the tire valve stem into the chambered end of the device and press upon the stem or valve, which pressure can be obtained by forcing the casing down upon the stem, and this pressing movement not only opens the valve and permits the passage of air to the tire, but also makes the proper tight connection between the end of the valve stem and the nipple of tire valve. The moment pressure is released, the valve automatically seats itself and further escape of air is prevented, owing to the peculiar shape and arrangement of the rubber disk and cap portion of stem upon which the air pressure is exerted.

In Fig. 4 we have shown a slight modification in which the stem is provided above the reduced portion with a head T of such size and shape as to fit within the chamber H and close the end of the passage G when the valve L is closed. In practice we prefer to provide the head T with a recess T' in which is seated a coil spring $T^2$ which bears against the top of the casing and serves to hold the valve closed. The lower edge of the head T is rounded or beveled as shown at $T^3$ so that upon the upward movement of the stem and valve the end of the passage G will be opened, thereby permitting the influx of air to the openings O' in the stem, and the stem and its head and the rubber disk or valve will be so dimensioned that the air inlet openings O' will be cleared just prior to the openings of the passage G so that the air from the passage G will find the inlet openings O' cleared for the admission of air. By means of this construction the valve is relieved of excessive air pressure and consequently very slight pressure upon the end of valve stem will be sufficient to open the valve ready for tire inflation. The moment pressure is removed from the valve stem, the spring T' will force the head and stem down so as to cut off the passage G and at the same time force the rubber disk or valve L back to its normal closed position.

It will thus be seen that we provide a hose connection for the purposes intended which consists of very few parts of simple construction, which parts will quickly and easily be assembled and operated with ease and economy.

Having thus described our invention, what we claim is:—

1. In a hose connection, the combination with a casing having an air inlet in communication with an air supply pipe, of a valve arranged in said casing, said valve comprising a flexible member having its outer edges connected with the casing, and a second member arranged in said first named member and having an air opening and passage, said second member having its outer end adapted for engagement with the tire valve stem, said second member being movable with reference to the first named member and adapted to flex said first named member when the second member is brought into contact with a tire valve stem.

2. In a hose connection the combination with a casing having an air inlet and a valve seat, said air inlet communicating with an air supply pipe, of a valve and a nut, said valve comprising a stem provided with an air inlet and passage, and a disk surrounding the air inlet portion of said stem, said disk being held between the nut and valve seat, the central portion thereof being movable with reference to the stem, the outer end of said stem being adapted for engagement with a tire valve stem, as set forth.

3. In a hose connection the combination with a casing, of a valve and nut for securing said valve, said valve comprising a movable stem provided with an air inlet and passage, a disk positioned within the casing and upon the stem and adapted to open and close the inlet of said stem, and an elastic cushion arranged at the outer end of the stem surrounding the passage of said stem, said outer end being within the nut as set forth.

4. A device of the kind described comprising a case having an air inlet, an apertured disk arranged within said case, a stem arranged in said case and within the disk, said stem having an air inlet and passage, that portion of the stem within the disk being reduced and having the air inlet, said disk being of a thickness to normally close said inlet, said stem being movable with reference to said disk whereby said inlet is opened.

In testimony whereof, we hereunto affix our signatures.

JAMES W. FRAZIER.
FRED E. HANSEN.